April 4, 1961 J. A. ISTEL ET AL 2,978,212
PARACHUTE AND ATTACHED SLEEVE
Filed Oct. 30, 1957 3 Sheets-Sheet 2

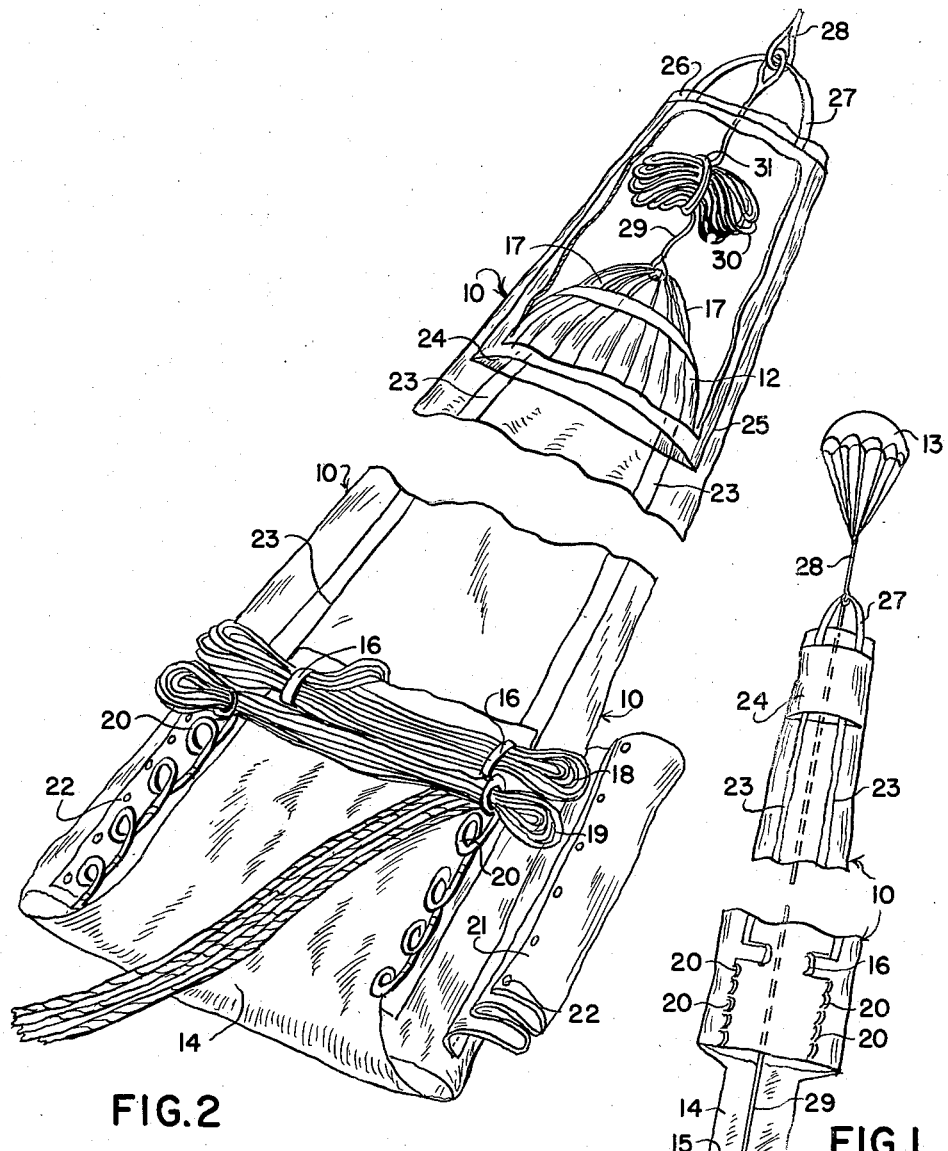

INVENTORS
Jaques Andre Istel
Lewis Barton Sanborn
BY
ATTORNEYS

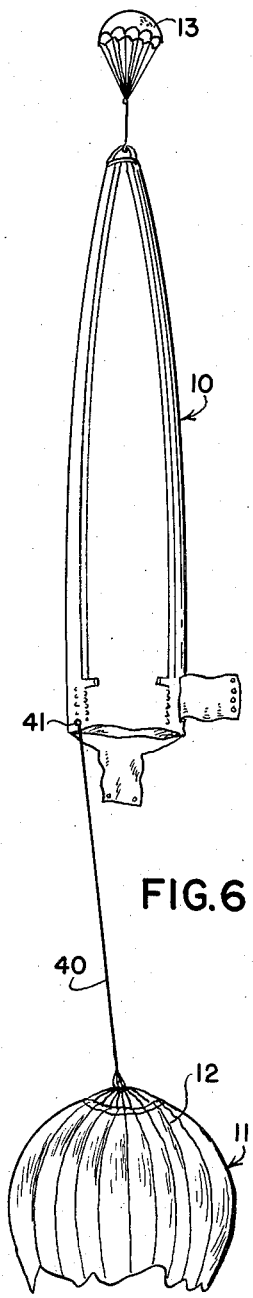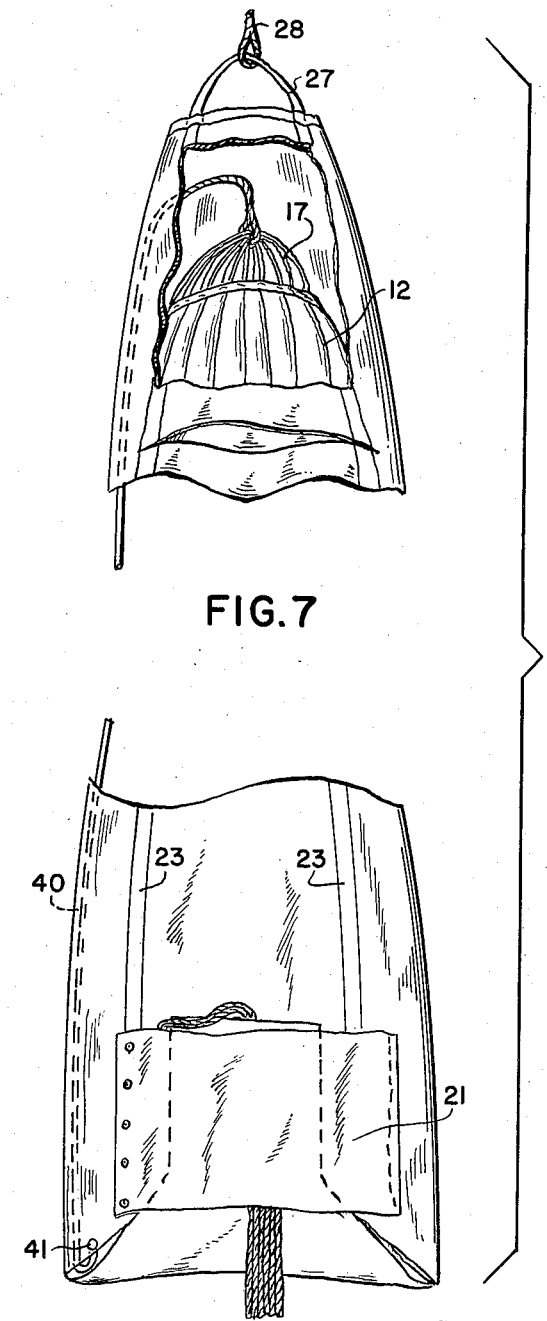

United States Patent Office 2,978,212
Patented Apr. 4, 1961

2,978,212

PARACHUTE AND ATTACHED SLEEVE

Jacques A. Istel and Lewis B. Sanborn, Bedford, N.Y., assignors to Parachutes Incorporated, Bedford, N.Y., a corporation of New York Filed Oct. 30, 1957, Ser. No. 693,442

7 Claims. (Cl. 244—148)

This invention relates to parachutes. More specifically, it pertains to a sleeve which is adapted to house the parachute before it is inflated and remain attached to the parachute after inflation.

Prior to the invention of sleeves, many jumping mishaps occurred when the parachute opened. On pulling the rip cord, the pilot parachute sharply jerked the canopy and shroud lines from the pack and the parachute inflated with a snap. This opening shock, combined with unstable body positions, was the major cause of the mishaps.

The sleeve is an elongated container, made of cloth, which looks much like a closed umbrella without stiffening ribs. The parachute canopy is inserted in the sleeve, which is as long as the canopy, in much the same way a pillow is put into a pillowcase. The shroud lines extend from the open end of the sleeve and are removably secured to the outer surface of the same. The pilot parachute is secured to the opposite end of the sleeve.

In operation, when the jumper pulls the rip cord, the pilot parachute stretches the sleeve out to its full length and the shroud lines separate from the sleeve and become straight as the jumper falls away. When all is taut, the weight of the jumper starts pulling the canopy out of the sleeve against the drag of the pilot parachute. As the canopy emerges from the sleeve, the jumper's body is straightened and aligned with the direction of fall, thereby eliminating instability. The gradual emergence of the canopy, from the sleeve, permits it to open without the customary snap.

The sleeve has a number of advantages in addition to those above noted. It is practically impossible for the shroud lines to become fouled with the canopy and the difficulties encountered in packing prior art parachutes are substantially eliminated. Further, the gradual inflation of the canopy reduces the explosive sound of the parachute opening, thereby facilitating the use of the parachute for military purposes.

Prior to this invention, certain disadvantages were evident in sleeves. The Russian sleeve, which is a prototype for most of the prior art, is formed with a short flap adjacent its open end. In packing, the shroud lines, which emerge from the open end of the sleeve, are first utilized to retain the flap in closed position. Following the formation of the flap locking stow, the lines are laid straight up the outside of the sleeve a certain distance and then are criss-crossed back and forth across the sleeve back down to the opening. When the lines are deployed, as the jumper falls away from the sleeve, there is a tendency for the lines to "burn" as they cross the locking stow. This "burning" can result in the weakening of the shroud lines and dangerous malfunctions.

The most important disadvantage of the prior art sleeve was its separability from the parachute. After the canopy inflated, the sleeve was carried away from the jumper by the pilot parachute. In sport jumping, this is undesirable because of the difficulty in locating the sleeve after the jump and the expense incurred in replacing lost sleeves. For military purposes, the separability of sleeve and parachute is an even more serious problem. A lost sleeve can inform the enemy that a parachutist has been landed in their territory.

The instant invention overcomes the problems encountered in the prior art by providing an improved sleeve which remains securely attached to the parachute after inflation.

It is an object of the invention to provide a sleeve which will remain attached to an inflated parachute without interfering with the normal operation thereof.

It is also an object of the invention to provide a sleeve which will eliminate "burning" of the suspension lines, on their deployment during the inflation of the parachute.

With these and other objects in mind, reference is had to the attached sheets of drawings, illustrating one form of the invention, wherein like characters represent like parts, and in which:

Fig. 1 is a fragmentary perspective view of a parachute with attached sleeve and pilot parachute;

Fig. 2 is a perspective view, partially broken away, showing the sleeve with canopy inserted and shroud lines partially stowed;

Fig. 6 is a fragmentary perspective view, showing the parachute with attached sleeve and pilot parachute; and Fig. 7 is a perspective view, partially broken away, illustrating the method of stowing the connecting cord to Fig. 6 when the canopy is inserted within the sleeve.

Figures 3, 4:
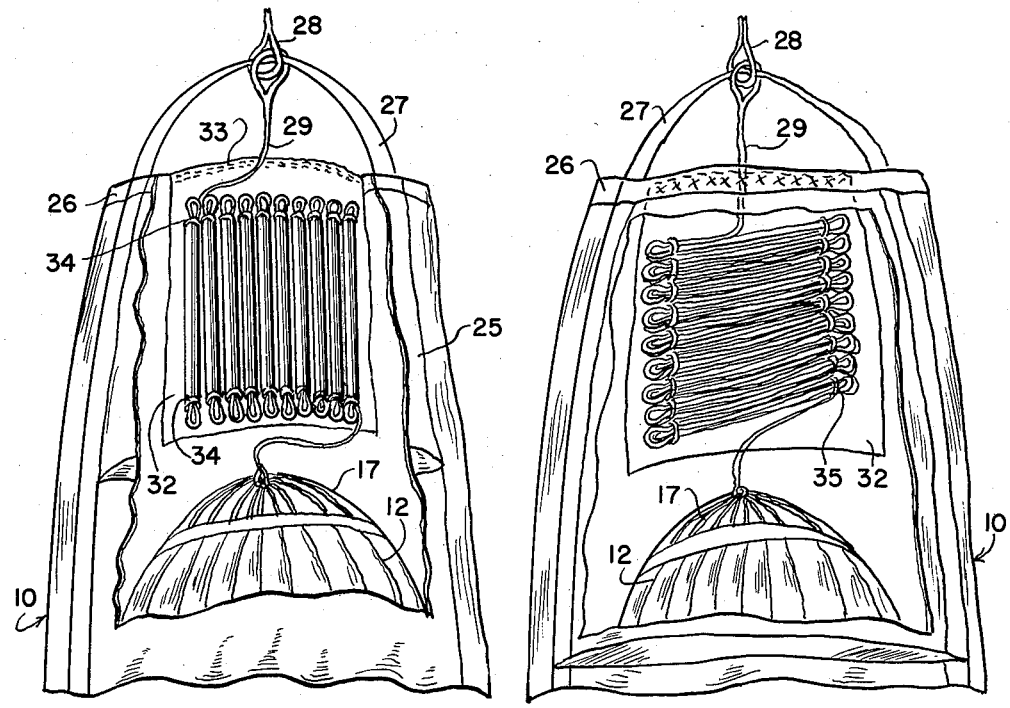
Fig. 3 is a fragmentary perspective view, partially broken away, illustrating the sleeve with inserted canopy and showing an alternative method for stowing the connecting cord.
Fig. 4 is a fragmentary perspective view, partially broken away, illustrating the sleeve with inserted canopy and showing an alternative method for stowing the connecting cord.

Basically, the instant invention is directed to an improved sleeve which is adapted to house a deflated parachute canopy and remain attached to the canopy when the same is inflated. The sleeve, which is generally indicated by the numeral 10 in Fig. 1, is adapted to ride above the parachute 11 when the canopy 12 is inflated. A pilot parachute 13 is secured to the end of a sleeve directed away from canopy 12 and acts to support the sleeve above the canopy.

On packing the parachute of this invention, the canopy is inserted within the sleeve such that its apex is adjacent the small end of the sleeve and its skirt adjacent the larger or open end thereof. The shroud lines emerge from the open end of the sleeve and a flap closes such open end. The shroud lines are laid longitudinally of the flap, between the sleeve and the same, toward the small end of the sleeve to a point adjacent the end of the flap and a locking stow is there formed, outwardly of the flap, to retain the same in closed position. Following the formation of the locking stow, further stows are formed in covering relation to the flap, across the sleeve and back down to the bottom end thereof at which point they are secured to the risers or other portions of a parachute harness. A line or connecting cord is secured between the apex of the canopy and the sleeve to prevent the separation of the two when the canopy is inflated. A pilot parachute is secured to the small end of the sleeve. The sleeve, with inserted canopy and pilot parachute, is folded and inserted within a parachute pack. For convenience of description, the sleeve, pilot parachute and connecting cord will be referred to as the sleeve assembly.

In operation, when the jumper pulls the rip cord, the pilot parachute stretches the sleeve out to its full length, and the shroud lines become straight, as the jumper falls away from the sleeve. When the sleeve and shroud lines become taut, the weight of the jumper starts pulling the canopy out of the sleeve, against the drag of the pilot parachute, enabling the canopy to inflate. The connecting cord between the canopy and the sleeve extends to its full length, thereby preventing the sleeve from separating from the inflated canopy.

In Fig. 2, a sleeve 10 is shown with a deflated canopy 12 inserted therein. The sleeve, which is an elongated hollow body of substantially cone-like shape, is provided adjacent its bottom or open end with a flap 14. The flap 14 is adapted to be folded across the open end of the sleeve or body portion 10 to close such opening and extends upwardly along the outer surface thereof. Two openings 15 are provided in the flap adjacent the corners, as best shown in Fig. 1, and are adapted to receive retaining loops 16 which are secured to the outer surface of the body portion. The retaining loops are preferably formed of elastic material but may be formed in any other manner known to the art.

Shroud lines 17 extend out of the open end of sleeve 10 and upwardly centrally of flap 14, between the sleeve and the flap, to a point adjacent the end of the same. A locking stow 18 is formed by shroud lines 17 and is inserted within the locking loops 16 to retain flap 14 in closed position. Thereafter, additional stows 19 are formed across flap 14, outwardly thereof, back down to the open end of the sleeve (only one such stow has here been shown to avoid unnecessary confusion). Each stow 19 is retained within loops 20 formed on the surface of the sleeve adjacent the longitudinal edges of flap 14. By stowing the shroud lines in this manner, the problem of "burned" suspension lines is eliminated. On deploying the lines, the bottom stow 19 is released first and the remaining stows 19 back up to the locking stow 18 follow. In this manner, the deploying lines do not cross any of the stows or suspension lines.

A flap 21 is secured to the outer surface of sleeve 10 and is adapted to be folded across locking stow 18 and additional stows 19 to protect the same. The flap 20 is retained in covering relation with the stows by means of snap fasteners 22, or in any other manner known to the art.

The sleeve, which may be formed of cloth or a similar foldable material, is longitudinally reinforced by tapes 23 of duck or like material. Two assistor pockets 24 are positioned on opposite sides of sleeve 10 adjacent the upper or small end thereof. These pockets, which act to shake out sleeve 10 such that it opens, are formed by securing a panel or patch 25 to the surface of the sleeve. Each patch 25 is secured to the sleeve along its top and side edges and, when the sleeve is in flat or uninflated condition, the panels 25 will form a cup-shaped hump above the sleeve. The hump is adapted to interfere with the flow of air passing the sleeve to assist the pilot parachute in opening the same. It is further believed that the assistor pockets will provide sufficient drag to enable the sleeve assembly to function should the pilot parachute fail to open. The upper end of the sleeve is open and the edges are reinforced by tape 26, or in any other manner known to the art. A strap 27 is secured across the opening in the small end of the sleeve to be engaged by the bridle cord 28 extending from the pilot parachute 13, and for purposes to be hereinafter explained.

A connecting cord 29 is secured, at the apex of the canopy 12, to the shroud lines 17 which pass therethrough and extends to the bridle cord 28 and strap 27, at which point its opposite end is secured. We have found that the connecting cord may conveniently be equal to the length of the sleeve, plus approximately 18 inches. This length may, of course, be altered as desired, but in any event should not be less than the length of the sleeve. The connecting cord may be secured to the shroud lines 17 at the apex of the canopy and to bridle cord 28 and strap 27 by means of a bowline knot, or in any other manner known to the art. It should here be noted that connecting cord 29 may be secured to bridle cord 28 alone, in lieu of the bridle cord and strap, as above described.

Referring to Fig. 2, wherein the canopy 12 is deflated and inserted within sleeve 10, the connecting cord 29 is folded back and forth upon itself to form a skein or bundle 30. An elastic band 31, or like retaining means, is positioned around the bundle to prevent the unravelling of the same before the canopy 12 is withdrawn from the sleeve. In this manner, the connecting cord 29 is prevented from becoming fouled with the canopy while the same is inserted in the sleeve and during deployment of the canopy.

The connecting cord 29 should be strong enough to retain the sleeve against displacement with respect to the canopy, when the canopy is inflated, yet should be weak enough to break if the pilot parachute 13 fouls with the aircraft during a static line jump. We have found that line having a strength of 100 to 150 lbs. is desirable, but we realize that line having different strength characteristics may be utilized.

Figure 5:
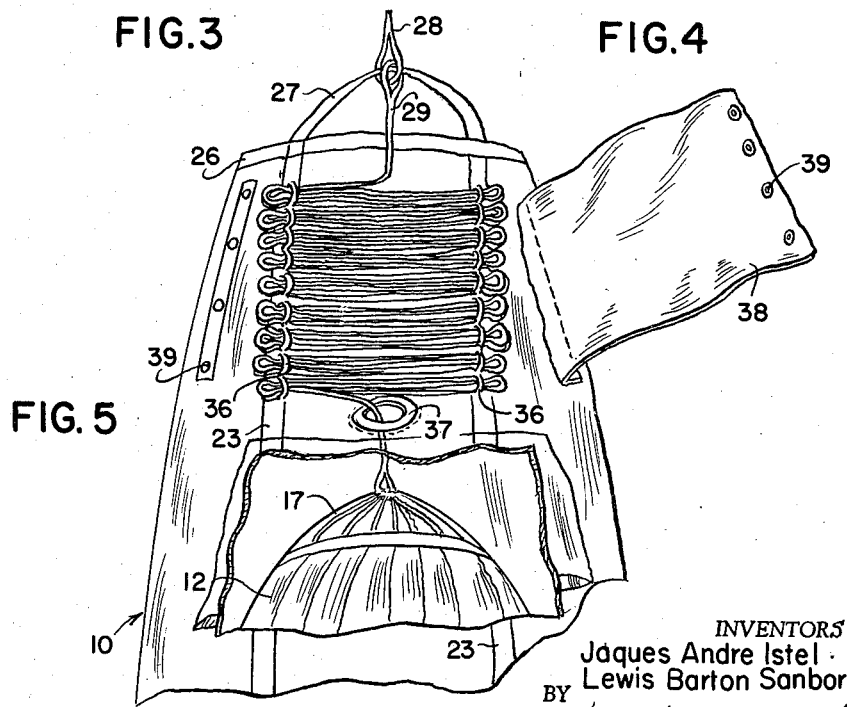
Fig. 5 is a fragmentary perspective view, partially broken away, illustrating the sleeve with canopy inserted and showing a further alternative method for stowing the connecting cord.

In Figs. 3 to 5, alternative methods for stowing the connecting cord 29 are shown. In each of the figures, a sleeve 10 houses a canopy 12 with the apex of the canopy directed toward and adjacent the small or upper end of the sleeve. Flaps 25 are secured to the sleeve 10 to form assistor pockets, and a tape 26 reinforces the opening at the upper end of the sleeve. A strap 27 is secured at opposite sides of the opening and a bridle cord 28, extending from the pilot parachute 13, is secured to the strap 27. As was described with respect to Fig. 2, a connecting cord 29 extends between the bridle cord and strap and the apex of the canopy. The connecting cord, as was previously described, is secured to the bridle cord 28 and strap 27 at one end and to the shroud lines 17, which extend through the apex of the canopy, at the other end.

In Fig. 3, a flap 32 is secured to the inner surface of sleeve 10 along the edge defined by tape 26 as at 33. The flap is adapted to be swung outwardly of the sleeve, through the opening formed in its small end, around edge 33 to expose the surface which lies adjacent the inner surface of the sleeve when the flap is folded within the sleeve. One row of spaced parallel retaining tubes 34 are secured to flap 32 on the side of the flap adjacent the sleeve when the flap is in inserted position. The tubes 34, which may be formed of durable cloth or like material extend in a direction across the longitudinal axis of the sleeve.

The connecting cord 29 extends downwardly from bridle cord 28 and strap 27 between flap 32 and sleeve 10. After the connecting cord passes through seam 33, it is passed back and forth across flap 32, each turn being secured within a retaining tube 34. The connecting cord is inserted in each tube through the end directed toward the unsecured end of flap 32. After the connecting cord has traversed the width of flap 32 and has been secured in tubes 34, its end is secured to the shroud lines 17 which pass through the apex of canopy 12.

In Fig. 4, a flap similar to that described with respect to Fig. 3, is provided. Two rows of spaced parallel retaining loops 35 are provided on the surface of the flap adjacent the inner surface of the sleeve when the flap is in inserted position. The retaining loops extend substantially parallel to the longitudinal axis of the sleeve. In stowing the connecting cord 29, a procedure similar to that previously described is followed. The connecting cord extends downwardly from bridle cord 28 and strap 27 between the flap 32 and the inner surface of the sleeve, and is passed back and forth across the flap such that each turn of the cord is retained within a loop 35. After the length of the flap has been completely traversed, the end of the connecting cord 29 is secured, as before, to the shroud lines 17 at the apex of canopy 12.

In Fig. 5, two rows of spaced parallel loops 36 are secured to the outer surface of the sleeve or body portion 10. Preferably, the loops are secured to the reinforcing tapes 23 to prevent tearing of the sleeve material. A reinforced opening 37 is formed in the sleeve between the rows of loops at the end of the rows directed away from strap 27. In securing the sleeve to canopy 12, the connecting cord 29 extends from bridle cord 28 and strap 27 outwardly of sleeve 10 back and forth across the surface of the sleeve, such that the turns of the cord are retained within the loops 36, and thence passes through opening 37, to the interior of the sleeve. The end of cord 29, which extends through opening 37, is secured, as with the previously described stowing methods, to the shroud lines 17 at the apex of the canopy. A flap 38 is secured to the outer surface of sleeve 10 and is adapted to be folded across the sleeve in covering relation to the stowed portion of connecting cord 29. The flap is retained in such position by means of snap fasteners 39, or in any other manner known to the art.

In each of the stowing methods above described, the connecting cord 29, which is secured between the bridle cord and strap and canopy 12, is retained against snarling and entanglement with the canopy. In operation, the connecting cord 29 will be withdrawn turn by turn from stowed position as the canopy emerges from the sleeve and will extend to its full length to retain the sleeve in connected relationship with the parachute.

Referring now to Figs. 6 and 7, the parachute 11, with sleeve 10 and pilot parachute 13, is shown. As illustrated, the sleeve is connected to the parachute by means of a connecting cord 40 which extends from a point adjacent the bottom or open end of the sleeve to the apex of the canopy and is of a length substantially equal to the length of the sleeve. The connecting cord 40 is secured to the sleeve at a reinforced tie-on point 41 and to the parachute at its apex, in the same manner as was earlier described. The tie-on point 41 may conveniently comprise a reinforced opening formed in the skirt of the sleeve through which an end of connecting cord 40 may extend prior to the formation of a knot or other retaining means. It is, of course, obvious that many other methods might be used to retain connecting cord 40 in association with sleeve 10.

On inserting the canopy 12 of parachute 11 in sleeve 10, the connecting cord 40 is stowed between the inner surface of the sleeve 10 and the outer surface of the canopy 12. When the cord is stowed in this manner, it is retained in substantially taut condition and therefore is unable to foul or become entangled with canopy 12.

Thus, among others, the several objects of the invention as aforenoted are achieved. Obviously, numerous changes in construction and arrangement of parts might be resorted to without departing from the spirit of the invention as defined by the claims.

We claim:

1. In combination, a parachute and parachute sleeve assembly, said parachute including a canopy and shroud lines extending through said canopy and below the skirt thereof, said sleeve assembly comprising an elongated, hollow, foldable body portion formed with an open end and adapted to removably house said canopy, means forming part of said body portion adjacent said open end for closing the same when said canopy is inserted within said body portion, stowing means secured to the outer surface of said body portion for retaining said shroud lines when said canopy is inserted within said body portion, a pilot parachute secured to said body portion at the end directed away from said open end, a connecting cord secured to said body portion for attachment to said canopy, and connecting cord stowing means secured to the outer surface of said body portion adjacent the end directed away from said open end for removably engaging said connecting cord between said body portion and said canopy, whereby—on withdrawing said canopy from said body portion and inflating the same—said body portion and said parachute will be retained in position with respect to one another.

2. In combination, a parachute and parachute sleeve assembly, said parachute including a canopy and shroud lines extending through said canopy and below the skirt thereof, said sleeve assembly comprising an elongated, hollow, foldable body portion formed with an open end and adapted to removably house said canopy, means forming part of said body portion adjacent said open end for closing the same when said canopy is inserted within said body portion, stowing means secured to the outer surface of said body portion for retaining said shroud lines when said canopy is inserted within said body portion, a pilot parachute secured to said body portion at the end directed away from said open end, a connecting cord secured to said body portion for attachment to said canopy, and connecting cord engaging means secured to the inner surface of said body portion adjacent the end directed away from said open end for removably engaging said connecting cord between said body portion and said canopy, whereby—on withdrawing said canopy from said body portion and inflating the same—said body portion and said parachute will be retained in position with respect to one another.

3. In combination, a parachute and parachute sleeve assembly, said parachute including a canopy and shroud lines extending through said canopy and below the skirt thereof, said sleeve assembly comprising an elongated, hollow, foldable body portion formed with an open end and adapted to removably house said canopy, means forming part of said body portion adjacent said open end for closing the same when said canopy is inserted within said body portion, stowing means secured to the outer surface of said body portion for retaining said shroud lines when said canopy is inserted within said body portion, a pilot parachute secured to said body portion at the end directed away from said open end, a connecting cord secured to said body portion for attachment to said canopy, whereby—on withdrawing said canopy from said body portion and inflating the same—said body portion and said parachute will be retained in position with respect to one another, and assistor pockets formed on opposite sides of said body portion at the end directed away from said open end for shaking said body portion open, said pockets comprising a substantially rectangular patch secured to said body portion along three edges.

4. In combination, a parachute and parachute sleeve assembly, said parachute including a canopy and shroud lines extending through said canopy and below the skirt thereof, said sleeve assembly comprising an elongated tubular and foldable sleeve formed with an open end and adapted to removably house said canopy, means forming part of said sleeve adjacent said open end for closing the same when said canopy is inserted within said sleeve, a pilot parachute secured to said sleeve at the end directed away from said open end and connecting means secured to said sleeve for attachment to said canopy, and connecting cord stowing means secured to the outer surface of said sleeve adjacent the end directed away from said open end for removably engaging said connecting means between said sleeve and said canopy, whereby on withdrawing the canopy from the sleeve and inflating the same said sleeve and said parachute will be retained in position with respect to one another.

5. In combination, a parachute and parachute sleeve assembly, said parachute including a canopy and shroud lines extending through said canopy and below the skirt thereof, said sleeve assembly comprising an elongated tubular and foldable sleeve formed with an open end and adapted to removably house said canopy, means forming part of said sleeve adjacent said open end for closing the same when said canopy is inserted within said sleeve, a pilot parachute secured to said sleeve at the end directed away from said open end and connecting means secured to said sleeve for attachment to said canopy, and engaging means secured to the inner surface of said sleeve adjacent the end directed away from said open end for removably engaging said connecting means between said sleeve and said canopy, whereby on withdrawing the canopy from the sleeve and inflating the same said sleeve and said parachute will be retained in position with respect to one another.

6. A combination as in claim 1, wherein said stowing means for retaining said shroud lines comprises two rows of spaced parallel elastic retaining loops extending longitudinally of said body portion and secured to the outer surface of said body portion adjacent said open end, and said loops being adapted to removably retain portions of said shroud lines.

7. A combination as in claim 6, wherein said means forming part of body portion for closing said open end comprises a flap formed with openings at the end directed away from said body portion and locking loops secured to said body portion and adapted to extend through said openings in said flap, whereby on inserting said canopy within said body portion and extending said shroud lines outwardly of said flap said locking loops engage a portion of said shroud lines to removably lock said flap in place and said retaining loops engage portions of said shroud lines to stow the same.

References Cited in the file of this patent
UNITED STATES PATENTS

| | | |
|---|---|---|
| 1,466,988 | Calthrop | Sept. 4, 1923 |
| 2,467,024 | Frieder et al. | Apr. 12, 1949 |
| 2,497,772 | Horning | Feb. 14, 1950 |
| 2,501,559 | Winzen et al. | Mar. 21, 1950 |
| 2,519,923 | Noelcke | Aug. 22, 1950 |
| 2,593,432 | Freas | Apr. 22, 1952 |
| 2,663,525 | Smith | Dec. 22, 1953 |
| 2,702,679 | Culver | Feb. 22, 1955 |
| 2,749,066 | Barnes et al. | June 5, 1956 |
| 2,765,132 | Oakley | Oct. 2, 1956 |

FOREIGN PATENTS

| | | |
|---|---|---|
| 931,870 | Germany | Aug. 18, 1955 |
| 1,114,023 | France | Dec. 12, 1955 |